May 14, 1957    J. M. WALLACE    2,792,530
THREE-PHASE CIRCUIT RECLOSERS
Filed May 25, 1953    4 Sheets-Sheet 1

INVENTOR
James M. Wallace.
BY
Ralph H. Swingle
ATTORNEY

May 14, 1957   J. M. WALLACE   2,792,530
THREE-PHASE CIRCUIT RECLOSERS
Filed May 25, 1953   4 Sheets-Sheet 3

WITNESSES:
E. A. McCloskey
F. V. Giolma

INVENTOR
James M. Wallace.
BY
Ralph H. Swingle
ATTORNEY

May 14, 1957  J. M. WALLACE  2,792,530
THREE-PHASE CIRCUIT RECLOSERS
Filed May 25, 1953  4 Sheets-Sheet 4

WITNESSES:
E. A. McCloskey.
F. V. Giolma

INVENTOR
James M. Wallace.
BY
Ralph H. Swingle
ATTORNEY

United States Patent Office 2,792,530
Patented May 14, 1957

2,792,530

THREE-PHASE CIRCUIT RECLOSERS

James M. Wallace, Montclair, N. J., assignor to Westinghouse Electric Corporation, East Pittsburgh, Pa., a corporation of Pennsylvania Application May 25, 1953, Serial No. 357,113

6 Claims. (Cl. 317—22)

My invention relates generally to circuit interrupters and it has reference in particular to interrupters of the automatic reclosing type.

Generally stated it is an object of my invention to provide in a simple and inexpensive manner for applying self-contained automatic reclosers in a polyphase system, so that reliable protection will be afforded against single line to ground faults.

More specifically it is an object of my invention to provide for effecting lockout of all three poles of a recloser in response to an opening of any one pole, and for using a reclosing relay for obtaining a predetermined number of reclosings before locking the recloser open.

Another object of my invention is to provide for simultaneously opening all three poles of a three pole recloser in response to a single line to ground fault, to prevent feedback through the ungrounded phases.

Yet another object of my invention is to provide for adapting a relatively inexpensive recloser for ground fault protection in a polyphase system.

It is also an object of my invention to provide for adjusting the counter of a three-phase recloser to obtain lockout in response to a single operation of any one pole, and for using a sequence relay to obtain a limited number of reclosings in response to lockout.

In practicing my invention is accordance with one of its embodiments the counters of a polyphase recloser having series solenoids individual to each pole for opening them, and a counter individual to each pole for operating a common lockout mechanism to lock all poles open, are adjusted to effect lockout in response to a single operation of any one pole. A predetermined sequence of reclosings is obtained before effecting lockout by using a sequencing relay to sequentially effect reclosing of the recloser for a predetermined number of times.

For a more complete understanding of the nature and scope of my invention, reference may be made to the following detailed description, which may be read in connection with the accompanying drawings in which.

Figure 1:
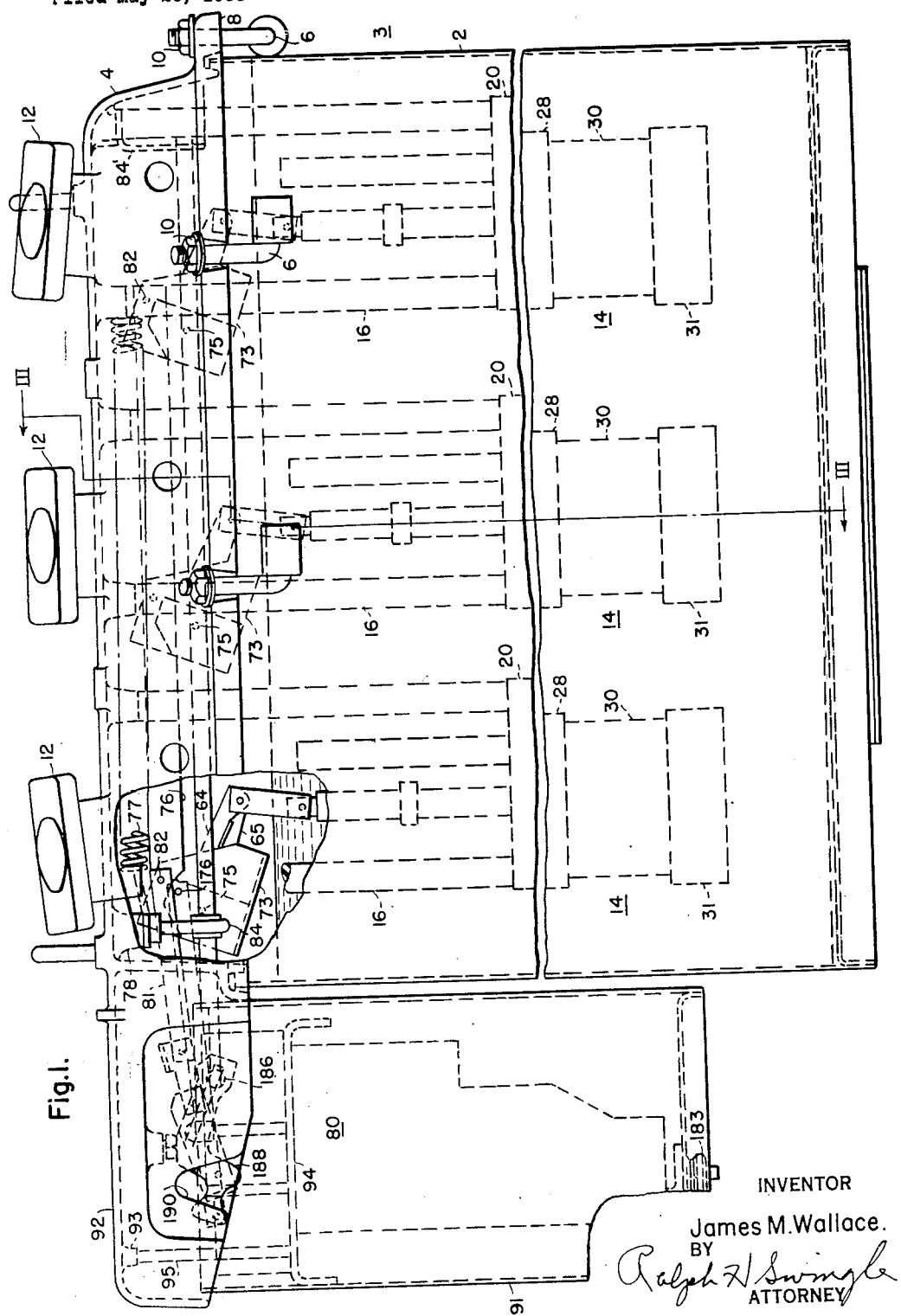
Figure 1 is a side elevation view, partly broken away, illustrating a three-pole power-operated circuit-interrupting device constructed in accordance with one embodiment of this invention.

The circuit interrupting device 3 shown in Fig. 1 is mounted in a metal tank 2 having an open top adapted to be closed by a hollow cover casting 4, which may be secured to the tank in any desired manner, for example as by bolts 6 secured to the tank and adapted to extend through openings in cover flange 8, to have nuts 10 thereon for drawing the cover down tight on the upper edge of the tank.

Figure 3:
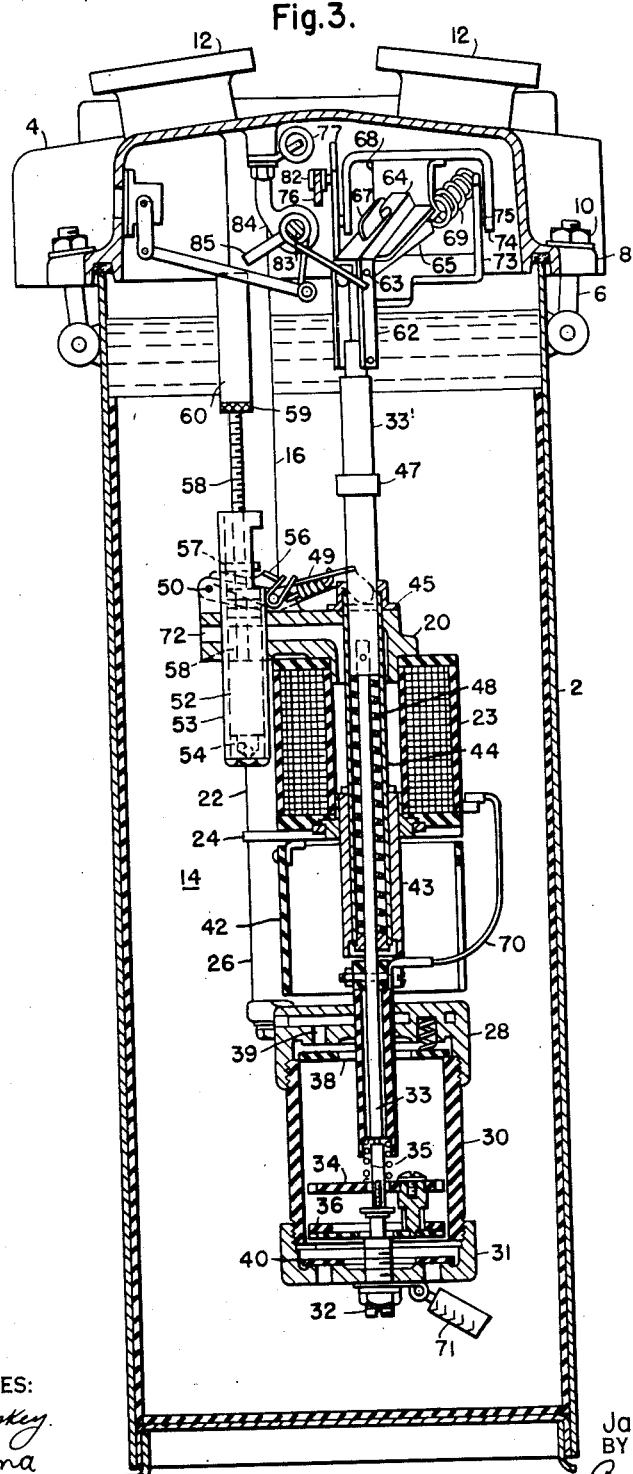
Fig. 3 is a transverse section of the interupter shown in Fig. 1 illustrating one of the automatic reclosing units, and taken substantially on the line III—III of Fig. 1.

The circuit interrupting device illustrated is substantially identical with that of copending application Serial No. 184,482 of Andrew W. Edwards et al., entitled "Circuit Interrupter Operating Mechanism," filed on September 12, 1950, and assigned to the assignee of the present invention, now Patent No. 2,748,221, and is shown as having three poles, with the cover having three spaced pairs of bushing supports 12 on which lead-in bushings for line conductors may be mounted. A switch unit 14 is provided for each pole, each of the switching units 14 being capable of automatically opening and closing the circuit. Each of these automatic reclosing units 14 is supported from cover 4 by supporting rods 16 which are directly secured to a casting 20 at their lower ends. Additional supporting rods 22 are for the purpose of supporting a series operating coil 23 between casting 20 and a supporting plate 24 spaced beneath the casting, and still further supporting rods 26 are for the purpose of supporting at their lower ends the top cap 28 of an arc chamber 30 from supporting plate 24. The supporting rods are as shown in Fig. 3, preferably of an insulating material. Arc chamber 30 includes a tube of insulating material, such as fiber, threaded into top cap 28, and having a bottom cap 31 threaded on the lower end thereof. A stationary contact screw 32 is threaded into a center opening provided in bottom cap 31 of the arc chamber, and it is adapted to be engaged within the chamber by the lower end of a movable contact rod 33 having a liquid directing structure 34 slidably mounted thereon within the arc chamber. Liquid directing structure 34 has lost motion relative to the contact and is biased downwardly by a spring 35 and further includes a check valve ring 36 providing for freer movement of the movable contact rod and liquid directing structure downwardly than in an upward direction, and the arc chamber itself is provided with an outlet valve ring 38 spring biased to normally uncover outlet passage 39 in the top cap 28, and an inlet check valve ring 40 controlling inlet openings in bottom cap 31.

A tubular gas shield 42 of insulating material, such as fiber, is supported between top cap 28 of the arc chamber and supporting plate 24 for the bottom of series coil 23, being secured to plate 24, to prevent gases escaping from outlet 39 of the arc chamber from gaining access to the central part of the casing in the vicinity of contact rod 33. A tubular solenoid core 43 is slidably mounted within series coil 23 and telescopically on contact rod 33, with an actuating tube 44 projecting upwardly therefrom to have an actuating washer 45 secured thereon at the top of casting 20, and being engageable with an integral shoulder 47 provided on the upper part 33' of contact rod 33. A coil compression spring 48 is interposed between solenoid core 43 and a shoulder adjacent the lower end of the upper portion 33' of contact rod 33 to be compressed as the core is attracted upwardly by coil 23.

In order to count the number of closely successive interrupting operations of the interrupting device, an actuating lever 49 is pivotally mounted on casting 20 as at 50, with its outer end resting on actuating washer 45, for advancing a counting piston 52 mounted in a vertical counting cylinder 53 having a liquid inlet in the bottom thereof controlled by a check valve 54, by means of a pawl portion 56 on the actuating lever which is engageable with ratchet teeth or flanges 57 formed on a rod 58 which extends upwardly from piston 52. At the upper end of piston rod 58, there is provided an operating rod 60 for a purpose to be described.

The upper portion 33' of contact rod 33 of each operating unit is pivoted to a pair of connecting links 62 which, in turn, are pivoted on a common pivot 63 to adjacent ends of a channel-shaped link 64, and a link 65 which has a hook portion 67 extending through an opening in the channeled link 64. The other end of channeled link 64 is pivoted in pivot depressions formed in the lower end of a pivot supporting bracket 68 secured to a lug integral with tank cover 4, and the two links 64 and 65 are held at the position shown by a coiled tension spring 69 engaged between a lug integral with tank cover 4 and link 65, to thus not only maintain the links in the position shown in Fig. 3, but also to exert substantial pressure on the contacts at the closed circuit position.

In operation, each automatic reclosing unit 14 being structurally substantially identical with the unit disclosed in the copending application of J. M. Wallace et al., Serial No. 162,174, entitled "Time Delayed Circuit Breakers," filed May 16, 1950, and assigned to the same assignee as this invention, now Patent No. 2,647,184, will operate in substantially the same manner as the units in such copending application. Accordingly, for a more complete description of the parts of each unit 14 and the mode of operation, reference is hereby made to the aforesaid copending application.

In general, operating coils 23 being connected in series in the respective phase conductors by a conductor (not shown) leading to one of the bushings on cover 4 and conductor 70 connecting each coil to its contact rod 33, and thence by a conductor 71 to the other bushing mounted on tank cover 4, each coil will operate to attract its solenoid core 43 on overcurrents in its circuit conductor, and after compressing spring 48 during upward movement, the core will eventually cause the washer 45 at the upper end of its tube 44 to engage shoulder 47 on the contact rod to separate the movable contact from stationary contact screw 32, and thus draw an arc in arc chamber 30. The arc thus drawn will be acted on by liquid directed through the arc by the liquid directing structure 34 which is picked up by the movable contact rod in its upward movement. The pressure existing within the arc chamber during arcing operates to seal off the inlet and outlet valves 40 and 38, respectively, and also acts to accelerate opening movement of the contact rod. Likewise upward movement of actuating sleeve 44 operates lever 49 and pawl 56 to advance counting piston 52 a predetermined amount. As soon as the arc within arc chamber 30 is extinguished, the movable contact rod is free to return, due to the force of gravity, and possibly some force due to spring 69, to thus automatically reclose the circuit through each unit. In doing so, the arc chamber 30 may be flushed out by gases escaping through the top cap 28 being replaced by fresh liquid entering the inlet openings in the bottom cap 31.

In the usual arrangement of automatic circuit opening and closing operations such as described above, each unit 14 is operable independently of the other, so that if the overload occurs on only one phase, only the unit 14 located in that phase conductor will operate, with the other units remaining closed.

As shown in Figs. 1 and 3, a generally U-shaped bracket 73 has its leg portions pivotally mounted at 75 on the leg portions of an inverted U-shaped supporting bracket 74 having the bight portion of the latter secured to an integral supporting leg in cover 4 for tank 2, there being such brackets for each of the automatic reclosing units 14, with the bight portion of each bracket 73 being positioned beneath links 64 and 65 connected to the upper end of the contact rod 33 of the respective units. One leg of each bracket 73 has pivotally connected therewith as at 82, a connecting rod 76 which is common to all of the units, having the bracket 73 of each unit pivotally connected thereto. Connecting rod 76 is biased to the left as viewed in Fig. 1 in a direction to rotate brackets 73 counterclockwise to bring their bight portions into engagement with their respective links 65 to raise the contact rods 33 and hold them at an open circuit position, by a coil tension spring 77, having one end secured to a lug 78 integral with cover 4, and having the other end secured to an angled end 79 of connecting rod 76. However, connecting rod 76 is normally locked against movement by an operating mechanism 80, since the inner end of the connecting rod is pivotally connected to a toggle link 81 thereof as at the pivot point 82.

Also common to all of the automatic reclosing units 14 is a trip shaft 83 which extends in proximity to the upper ends of all of the units, being rotatably supported at its inner end in a bearing bracket 84 suspended from the cover 4, and at its outer end in a bearing bracket 84' also supported from the cover. Trip shaft 83 is provided with a plurality of radially extending cranks 85, there being one for each automatic reclosing unit 14, and an additional one located within a container 91 for the operating mechanism, for a reason which will be hereinafter explained.

The hollow cover 4 for tank 2 has an integral extension 92 at one end which extends outwardly beyond that end of the tank and has therein integral supporting lugs 93 for supporting a plate 94 at a position spaced beneath the cover, as by one or more operating mechanism supports 95.

Figure 2:
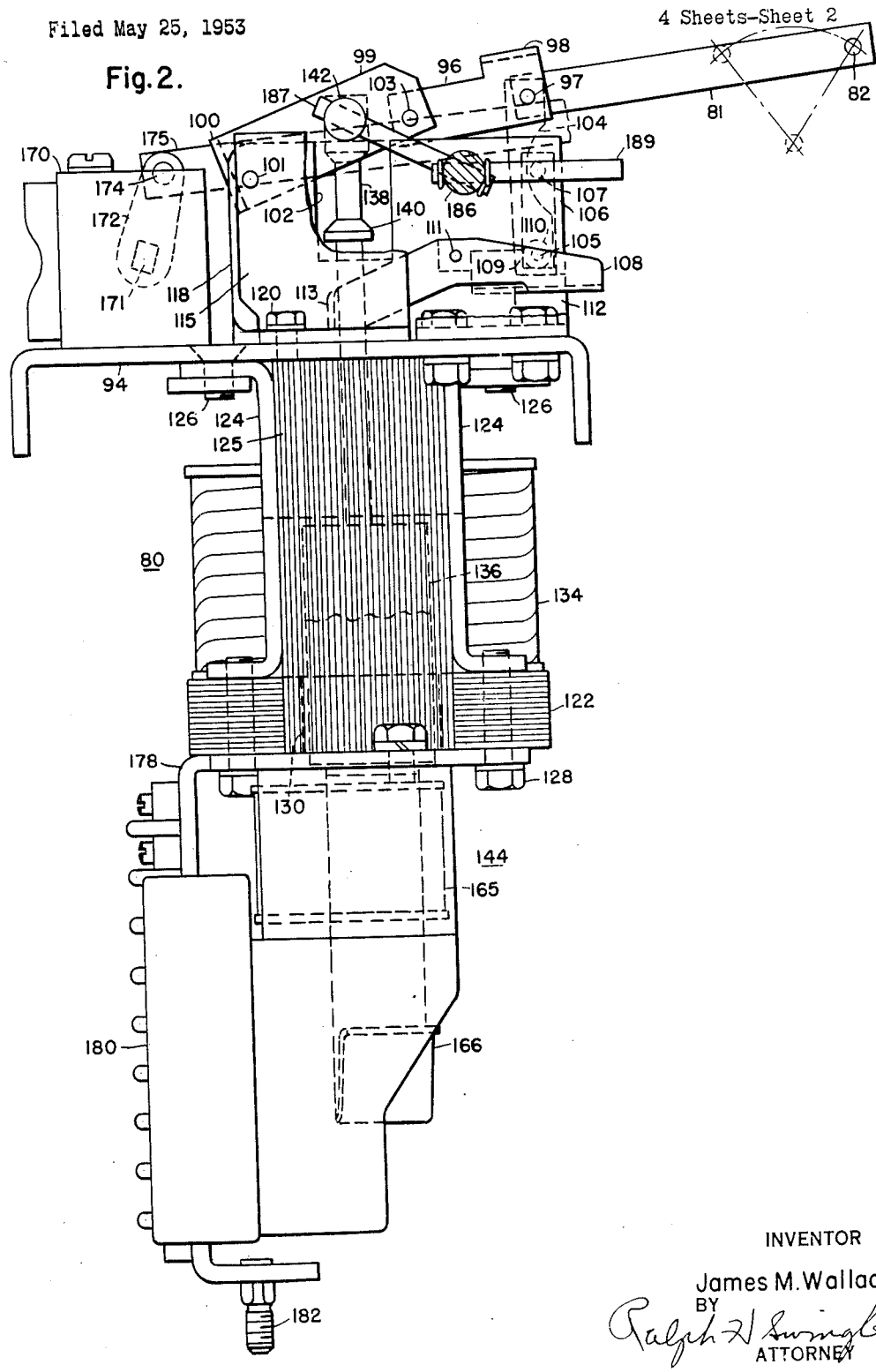
Fig. 2 is an enlarged side elevation view of the power operating mechanism shown in Fig. 1, with the cover removed and certain of the parts broken away and illustrated in section.

The operating mechanism as shown partly in Fig. 1 and principally in Fig. 2 includes a toggle linkage mounted on top of supporting plate 94 comprising the toggle link 81 which is connected to the pivot 82 for the adjacent switch unit 14 at one end, and at its other end is connected to a second toggle link 96 which is of inverted U-shape at the end adjacent to link 81, to form one overcenter pivot 97. Toggle link 96 has a bight portion 98 overlying the adjacent end of link 81 to limit relative movement of overcenter pivot 97 downwardly. A third toggle lever 99 also of U-shape has the legs thereof adjacent bight portion 100 mounted on a stationary pivot 101 on a stationary supporting bracket 102 also of substantial U-shape with its bight portion secured to the upper side of mechanism supporting plate 94. Toggle lever 99 is connected to link 96 by an overcenter pivot 103, so that the toggle linkage includes the two overcenter pivots 97 and 103.

Overcenter pivot 97 of the toggle linkage is adapted to be held against movement at the closed circuit position of the interrupting device by means of a toggle latch link 104 pivoted on the same axis as overcenter pivot 97 at one end, and at its other end having an overcenter latch pivot 105 with a second toggle latch link 106, which, in turn, is stationarily pivoted at 107 between the legs of bracket 102. It will be observed that at the closed circuit position of the parts illustrated in Figs. 1 and 2, overcenter pivot 97 is slightly above the center line between toggle pivots 103 and 82, so that spring 77 tends to break this toggle upwardly, but this is prevented by a latch lever 108 having a latch shoulder 109 engaging a roller 110 provided on overcenter latch pivot 105 which prevents this pivot from moving to the left as viewed in Fig. 2, and consequently holds overcenter pivot 97 of the overcenter linkage from breaking upwardly. Latch lever 108 is mounted on a stationary pivot 111 at one end outside of bracket 102 with an inwardly directed part extending through an opening 112 in one side of bracket 102 to support shoulder 109 inside the bracket, and having at the opposite end a laterally extending portion 113, for a purpose to be described.

Figure 4:
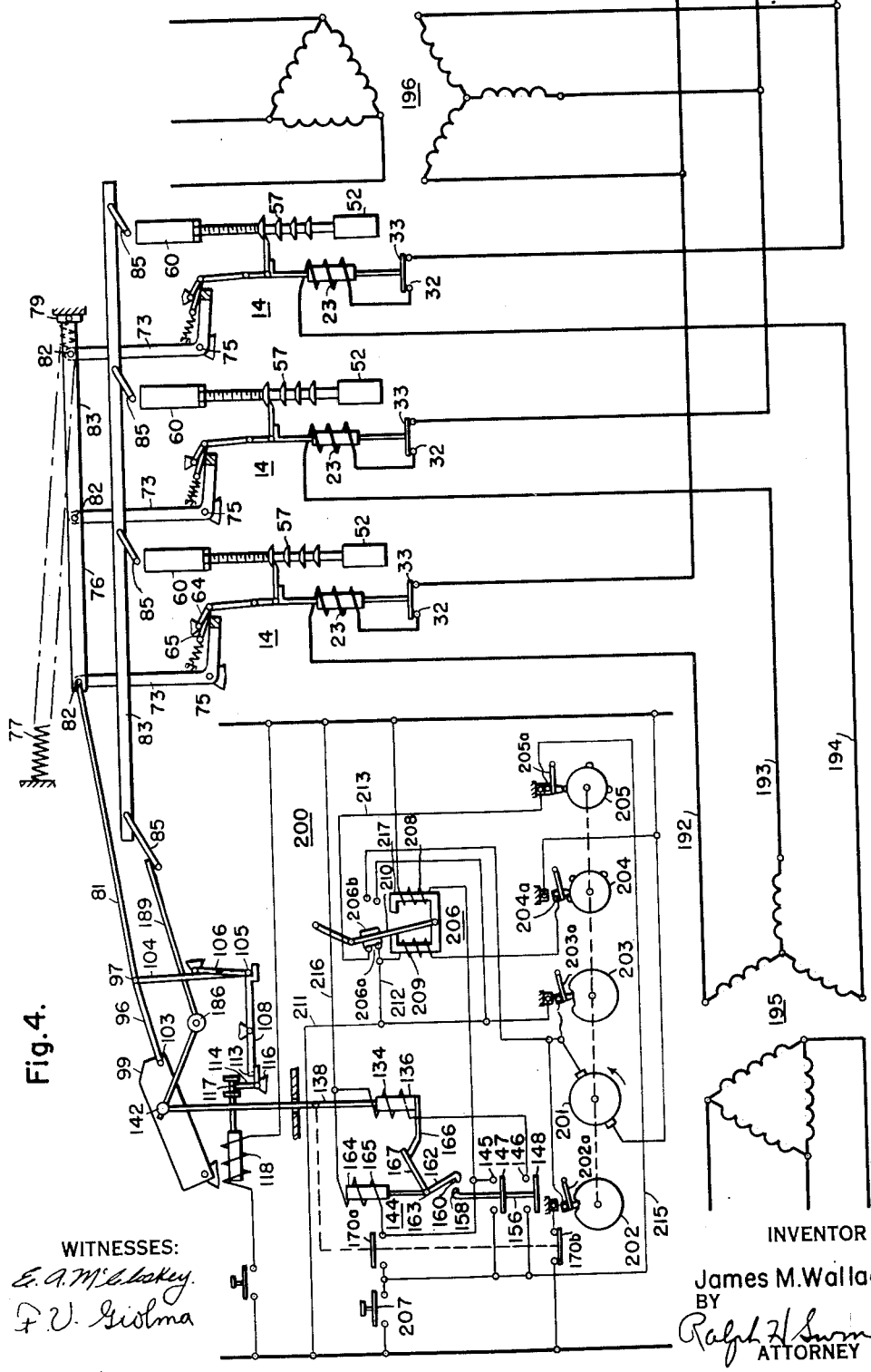
Fig. 4 is a diagrammatic view of a polyphase automatic reclosing apparatus embodying the interrupter device of Fig. 1.

Referring to Fig. 4 of the drawings, it will be observed that extension 113 of latch lever 108 overlies one leg of a latch release bell crank 114 pivotally mounted on a supporting frame 115 at 116. The other end of latch release bell crank 114 is received in an annular groove provided in the outer end of the core 117 of a trip coil 118, which is mounted within supporting frame 115 of inverted U-form, and secured to mechanism supporting plate 94, as by the bolts 120.

A laminated plate 122 of magnetic material, such as soft iron, is supported at a point spaced beneath mechanism supporting plate 94 by a pair of channel-shaped supporting plates 124, which may also be of magnetic material with the channel plates being secured to mechanism supporting plate 94 as by bolts 126, and supporting magnetic plate 122 as by bolts 128. Magnetic plate 122 is provided with a central opening 130, which lines up with the central opening in a closing coil 134 mounted in cutout parts of channel supporting plates 124 and laminations 125 therebetween, with the former openings adapted to receive an armature 136 for closing coil 134, and the armature has an operating rod 138 projecting from the upper end thereof. Armature operating rod 138 has an integral stop flange 140 thereon positioned above mechanism supporting plate 94 and at its upper end is pivoted as on pivot pin 142 to toggle lever 99.

It will now be observed that in the closed position of the circuit interrupting device shown on the drawings, both overcenter pivot 97 and 103 of the toggle linkage are held at positions slightly above their central positions so that contact opening spring 77 tends to break both of these toggles upwardly, and both are held against such movement, with overcenter pivot 97 being held by latch 108 and overcenter pivot 103 being held against further upward movement by engagement of armature 136 of the closing coil with a stop formed by central depending portions of coil supporting channel plates 124 and the laminations 125 therebetween. Opening of the contacts can be accomplished from a remote location by causing energization of trip coil 118, which will attract its armature 117 inwardly to rotate latch release lever 114 in a counterclockwise direction (Fig. 4) to thus rotate latch release lever 108 clockwise (Figs. 2 and 4), to release overcenter latch pivot 105 and permit the linkage to move from the position shown in Figs. 1 and 4 to that where overcenter pivot 97 breaks upwardly. After this has occurred, the biasing force of gravity on core 136 of the closing solenoid moves it and toggle link 96 downwardly, and the parts ultimately reach a position where overcenter latch pivot 105 will again be latched by latch lever 108. The linkage now is in condition for closing the contacts of the circuit interrupting device from a remote point by causing energization of closing coil 134, which attracts its armature 136 upwardly forcing counterclockwise rotation of toggle link 99 to thus restore the linkage to the position shown in Figs. 2, 3 and 4 with the contacts of the circuit interrupting device closed.

For the purpose of energizing closing coil 134, there is provided a relay 144 which is mounted beneath the closing solenoid 134. Relay 144 is, as shown in Fig. 4, provided with two sets of spaced stationary contacts 145 and 146. These stationary contacts 145 and 146 are adapted to cooperate with movable contacts 147 and 148 mounted on one end of a contact lever 156, also preferably of a molded insulating material, carrying at the other end thereof a transverse actuating pin 158. In closing the relay contacts, the actuating pin 158 of the contact lever is adapted to be engaged by the shoulder 160 on an operating link 162 which is pivotally mounted at 163 in the lower end of an armature 164 for relay coil 165. Operating link 162 of the relay may be normally biased in a clockwise direction, as viewed in Fig. 4 to cause engagement of its shoulder 160 with actuating pin 158 of the contact lever 156, by a suitable spring (not shown). Movable contact lever 156 is biased for movement to disengage movable contacts 147 and 148 from stationary contacts 145 and 146. For the purpose of releasing operating link 162 from actuating pin 158 of the contact lever, there is secured to the lower end of armature 136 of the closing coil 134, an angularly shaped extension 166 having an outer end which extends into proximity with an angular extension 167 on operating link 162 to move its shoulder 160 out from beneath actuating pin 158 on the contact lever, to thus mechanically disconnect the relay armature 164 and movable contact lever 156 from operating link 162 when the solenoid core 136 attains its uppermost or closed circuit position, so that the relay contacts are then permitted to be opened, and shoulder 160 is prevented from reengaging pin 158, irrespective of whether or not relay coil 134 is then energized.

At the position of the parts of the relay shown in Fig. 4 of the drawings, extension 166 of the core 136 of the closing solenoid has engaged extension 167 of link 162 to remove shoulder 160 from beneath actuating pin 158 on the contact lever 156, and the relay contacts have opened. With the relay contacts open, closing coil 134 and relay coil 165 are then both deenergized, and armature 164 of the closing relay is prevented by extension 166 from descending under the influence of gravity.

If trip coil 118 is energized, toggle latch lever 104 is released permitting lever 99 to rotate clockwise and armature 134 to drop. This removes extension 166 from interfering with extension 167 of link 162, thus permitting operating link 162 to rotate in a clockwise direction where it will be in a position to reengage actuating pin 158 of the relay contact lever, as soon as armature 164 of the relay coil descends a sufficient distance. Upon reenergization of relay coil 165, as by closing switch 207 or otherwise, its armature will be drawn upwardly and the operating link will carry actuating pin 158 upwardly to close the relay contacts. Then closing coil 134 will be reenergized through contacts 146 and 148 and its armature 136 will be moved upwardly to close the contacts of the interrupting device as previously explained, and ultimately cause operating link 162 to be moved out from under actuating pin 158, thus mechanically releasing the relay contacts for opening movement when the closing solenoid has completed its travel and the contacts of the interrupting device are closed.

At the left as viewed in Fig. 2, mechanism supporting plate 94 has an integral extension on which is mounted a limit switch 170. This switch has an operating shaft 171 provided with an operating crank 172 at the outer end of which is pivotally connected at 174, a link 175 connected at its other end to the adjacent bracket 73 as by pivot 176. Limit switch 170 includes a plurality of sets of stationary contacts spaced along the length thereof and adapted to cooperate with bridging contacts to connect the circuit between each set of stationary contacts dependent upon the position of the contacts of the circuit interrupting device. Each of the stationary contacts of the limit switch has a terminal at the exterior for connection of the various circuits thereto including indicator light circuits, for indication of the condition of the circuit interrupting device at a remote location.

A supporting bracket 178 is secured to the lower side of magnetic plate 122 of the operating mechanism as by bolts 128 and it, in turn, supports a terminal block 180 of insulating material, such as porcelain, having a plurality of terminal screws thereon to which the various connections to the electrically energizable components of the operating mechanism may be made. The support 178 for the terminal block also is provided with a screw threaded stud 182 projecting downwardly to be received in an opening in the bottom wall of casing 91 for the operating mechanism and then have a nut 183 threaded thereon to hold the casing 91 in a position where it receives the operating mechanism and forms a substantially complete enclosure therefor with cover 4 for tank 2.

In order to manually operate the circuit interrupting device, an operating shaft 186 is journalled in the bracket 102 on mechanism supporting plate 94 and it has a radially projecting pin 187 slidably received in an opening provided in pivot pin 142 of toggle link 99. Operating shaft 186 extends beyond the operating mechanism to have an operating handle 188 secured thereon which is normally positioned (Fig. 1) beneath an offset hood portion 92 provided integral with one side of tank cover 4, and having a notch 190 therein through which the outer end of the handle is accessible for operation, as by a hook-stick operating member or the like. A lever 189 is provided on shaft 186 to be engaged by radial rod 85 beneath the extension 92 of the cover for tripping the interrupters and locking them open in response to predetermined movement of counter rods 60.

Assuming the parts of the operating mechanism and circuit interrupting device to be at the closed circuit position illustrated, it will be apparent that by pulling downwardly on handle 188, the operating shaft 186 will be rotated in a direction such that its operating pin 187 causes toggle link 99 to move downwardly, thus moving overcenter pivot 103 downwardly and over its center to the position where the toggle linkage is broken, and at which position the circuit interrupting device is held at open circuit position by spring 77 mounted in cover 4. At this time, handle 188 will project beneath cover hood 92, and it will be apparent that by moving this back up to the position shown in Fig. 1 toggle link 99 will be moved back upwardly to move overcenter pivot 103 upwardly overcenter to the position shown in Figs. 2 and 4 where it is held by engagement of core 136 of the closing coil with shoulders formed on channel supporting plates 124, with the contacts of the circuit interrupting device thus being held at their closed circuit position.

As previously described, the counting piston 52 of each automatic reclosing unit 14 in a recloser of the usual type may, on sustained overload in that particular phase of the circuit, be advanced upwardly until after a predetermined number of closely successive operations the operating extension 60 thereof engages the radial crank 85 on the trip shaft 83 located immediately thereabove, to rotate the trip shaft and thus cause the inner radial crank 85 to rotate operating shaft 186 in a direction to move toggle lever 99 downwardly and overcenter pivot 103 downwardly overcenter, to thus release tension spring 77 to move connecting rod 76 to the left. Such movement of connecting rod 76 carries with it each of the brackets 73, causing each bracket to lift the movable contact rod of its unit 14 and thus open the contacts of all of the units and hold them open. Also as described hereinbefore, the contacts of all units 14 may be opened from a remote location by energization of trip coil 118, which releases overcenter pivot 97 for movement upwardly, and this also releases spring 77 and permits it to open the contacts of all units 14, as previously described. Also the contacts of all units 14 may be manually opened and closed by movement of handle 188 in opposite directions, as previously described, because this will move overcenter pivot 103 of the linkage overcenter in opposite directions to either release spring 77, or prevent operation thereof. Furthermore, when the contacts of all units 14 have been opened by either manual, power, or automatic operation, they may be closed by energization of closing coil 134 from a remote point, which operates to reset toggle lever 99 and overcenter pivot point 103 to the position shown in Figs. 2 and 4.

In order to provide more adequate protection against line to ground faults on polyphase systems where feedback from the other phases through transformers on the load side of the fault will prevent interruption of the fault current by opening the grounded line, I modify the recloser of the Wallace et al. application Serial No. 184,482 by either adjusting or extending the operating rods 60 upwardly to effect engagement with radial cranks 85 on the first operation of any one unit of the recloser, thus opening all units, and locking them open. For example, the rods 60 may be threadedly disposed on the extensions 58 being held in place by lock nuts 59. Reclosing may be effected by means of any suitable reclosing device such as will be hereinafter described in detail.

Referring to Fig. 4 of the drawings, it will be seen that the electrically operated three-phase circuit interrupter of Fig. 1 may be used in conjunction with other apparatus to provide ground fault protection by connecting the switch units 14 thereof in the several conductors 192, 193 and 194 of a polyphase circuit, which may be supplied with electrical energy from the Y connected secondary of a transformer 195 and connected to the Y connected primary of a transformer 196 for supplying load circuits.

Reclosing of the circuit interrupting device 3 may, as shown in Fig. 4, be controlled by a reclosing relay 200 which may be substantially of the type shown and described in detail in Patent 2,439,920, which issued on April 20, 1948 to M. J. Brown, entitled Automatic and Manual Control System for Circuit Breakers.

In general relay 200 may comprise a timing motor 201 driving a series of cams 202, 203, 204 and 205 for operating cam switches 202a, 203a, 204a and 205a. A lockout relay 206 of the toggle type having a C-shaped magnetic core 217 with operating and reset windings 208 and 209 for actuating a toggle type contact member 210 back and forth functions in conjunction with cam switches 204a and 205a to permit a predetermined number of energizations of closing relay winding 165. After three such operations, reclosing relay 200 locks open. Cam switches 202 and 203 control operation of the timing motor.

With the system in the operating condition shown in Fig. 4, a ground fault on any one of the line conductors 192, 193 or 194 energizes the corresponding solenoid coil 23 sufficiently to effect separation of the contacts of its unit. The counting piston 52 thereof is advanced, and operating rod 60 engages radial trip crank 85, rotating trip shaft 83 so that additional crank 85 engages lever 189 rotating shaft 186 and depressing pivot 142 so as to move lever 99 clockwise and break the toggle relation between levers 96 and 99. This permits lockout spring 77 to move lockout lever 76 to the left, actuating levers 73 to lock the contacts of all the units 14 open. The fault current will therefore be interrupted as all phases are open.

When lever 99 moves clockwise, armature 136 drops, extension 166 is removed from interference with lever 162 and closing relay 144 resets, and auxiliary switch contact 170a closes. This provides an obvious energizing circuit for closing relay 144, extending from one side of the source through conductors 211, 212, contact 206a, conductor 213, cam switch 205a, conductor 215, contact 170a, winding 165 and conductor 216 to the other side of the source. Closing relay 144 closes contacts 147 and 148, energizing closing winding 134 to rotate lever 99 counterclockwise and close interrupter units 14 by relatching lockout member 76, whereupon toggle levers 64—65 act to close the interrupter contacts. As soon as the interrupter devices close, extension 166 engages lever 162 to release contacts 147, 148 and deenergize the closing relay 144 and closing coil 134.

When the closing relay 144 is energized, operating winding 208 of the relay 206 is energized in parallel therewith and toggle member 210 is actuated to the right. This closes contacts 206b and sets up a circuit for the timing motor 201 which operates cam switch 203a to set up a circuit for the motor until several degrees before reset, which occurs after 360 degrees of rotation. If the interrupter devices remain closed, the motor runs until cam switch 203a opens, whereupon the circuit is continued to the reset position through cam switch 202a and auxiliary contact 170b. Relay 206 is reset through cam switch 204a after about 15 degrees of rotation.

Should the interrupter device open following the first reclosure, a second reclosure will be initiated by cam switch 205a after about 90 degrees of rotation in a manner similar to that described, and a third one at about 180 degrees of rotation. The motor 201 continues to run, with cam switch 204a resetting relay 206 at about 350 degrees. As the interrupters are open no motor circuit is completed through cam switch 202a and contact 170b, and the motor stops when cam switch 203a opens at about 354°.

The interrupter device 3 is now locked open and may be reclosed by operating pushbutton switch 207, which provides an obvious energizing circuit for closing relay 164. Contact 170b then provides a reset circuit for timing motor 201 through cam switch 202a, which opens at 360 degrees to reset the apparatus for further operation.

From the above description and accompanying drawings it will be obvious that I have provided a simple and inexpensive interrupter which is highly effective in interrupting ground faults even in systems where 3-phase transformers provide feedback. A system using an interrupter embodying the features of my invention will immediately interrupt all three phases so that reclosing may be successfully effected if the fault is not permanent. Instead of using the customary three pole circuit breaker, a reclosing relay and three current transformers and their associated current relays, I utilize a relatively inexpensive recloser with a single reclosing relay.

Since certain changes may be made in the above-described construction, and different embodiments of the invention may be made without departing from the spirit or scope thereof, it is requested that the matter contained in the above description and shown in the accompanying drawings be considered as illustrative and not in a limiting sense.

I claim as my invention:

1. A circuit interrupter comprising, a plurality of pairs of separable contacts, solenoid means individual to each pair of contacts for effecting separation of the contacts in response to a predetermined value of current, normally inactive lockout means operable to bias all of said contacts open, a counter individual to each solenoid means operable to activate the lockout means, electromagnetic means operable to render the lockout means inactive, reclosing means operable with different intervals of delay to sequentially render the electromagnetic means operable, and switch means operable by operation of the lockout means to render the reclosing means operative for a predetermined number of closely successive operations.

2. In a circuit interrupter, a plurality of pairs of individually separable contacts, series solenoid means individual to each pair of contacts providing the energy for separating said pair of contacts in response to an overcurrent through said pair of contacts, lockout means biased to separate all of said contacts, latch means normally rendering the lockout means inactive, a counter individual to each pair of contacts operable to release said latch means on the first operation, electromagnetic means operable to reset the latch means and render the lockout means operative, and sequence switch means sequentially effecting operation of the electromagnetic means a predetermined number of times.

3. A circuit interrupter comprising, a plurality of pairs of separable contacts, electroresponsive means individual to each pair of contacts for separating said pair of contacts including a solenoid connected in circuit with said contacts and an armature actuated in response to an overcurrent through the solenoid to separate said pair of contacts, lockout means common to all pairs of contacts including a single member biased to lock all of said pairs of contacts open, a toggle latch normally rendering the lockout means ineffective, a counter member individual to each pair of contacts advanced in response to a predetermined number of operations of its contacts to effect release of the toggle latch on the first operation, electromagnetic means operable to reset the toggle latch, and reclosing means activated by operation of the electromagnetic means to effect operation thereof after different intervals of delay.

4. In a recloser, a plurality of pairs of separable contacts, means biasing said contacts closed, series solenoid means connected in series with each of said pairs of contacts each having an armature operable to separate a pair of said contacts against the force of the biasing means, lockout means biasing all of said contacts open, latch means normally set to prevent operation of the lockout means, a counter individual to each armature advanced in response to any one operation of said armature to release said latch means, electromagnetic means operable to reset said latch means and close all of said contacts, a sequence relay operable to effect a sequence of operations of the electromagnetic means, and a switch actuated by the lockout means to render the sequence relay effective.

5. A polyphase circuit interrupter comprising, a pair of separable contacts for each phase of a polyphase circuit, electroresponsive means individual to each pair of contacts having an armature movable to effect separation of its pair of contacts, a common lockout member for locking all pairs of contacts open, means normally biasing the lockout means to lock said contacts open, a single latch normally set to prevent movement of the lockout member, a counter individual to each pair of contacts advanced by operations of the armature to release the latch on the first operation, electromagnetic means operable to reset the latch and render the lockout member ineffective, means including a cam sequence switch setting up an energizing circuit for the electromagnetic means at differently spaced intervals, and an auxiliary switch actuated by the electromagnetic means connected to complete said circuit.

6. A polyphase recloser comprising, a plurality of pairs of separable contacts, series electroresponsive means individual to each pair of contacts operable to separate them in response to a predetermined value of current, biasing means biasing said contacts to reclose following a separation, lockout means including a common lockout member normally biased to separate all pairs of contacts, a toggle latch normally making the lockout member ineffective, means individual to each pair of contacts operated by each operation of the electroresponsive means to release said latch, electromagnetic means operable to reset said toggle latch and render the lockout means ineffective, and motor operated reclosing means operable to effect operation of the electromagnetic means a predetermined number of times in response to such separation of said contacts.

References Cited in the file of this patent

UNITED STATES PATENTS 2,567,411     Van Ryan _____ Sept. 11, 1951
2,593,225     Van Ryan et al. _____ Apr. 15, 1952